(12) United States Patent
Aboonasry et al.

(10) Patent No.: US 6,624,407 B1
(45) Date of Patent: Sep. 23, 2003

(54) ENCODER WITH MASK SPACER CONTACTING THE ENCODER FILM

(75) Inventors: Dariush Aboonasry, Lexington, KY (US); Christopher Alan Adkins, Lexington, KY (US); Alexander Lloyd Chapman, Lexington, KY (US); Darell Dean Cronch, Georgetown, KY (US); David Michael Cseledy, Lexington, KY (US); Edmund Hulin James, III, Lexington, KY (US); Michael Anthony Marra, III, Lexington, KY (US); Barry Baxter Stout, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/898,375

(22) Filed: Jul. 3, 2001

(51) Int. Cl.[7] .................................................. G01D 5/34
(52) U.S. Cl. .................... 250/231.14; 341/13; 356/616; 356/617
(58) Field of Search ........................ 250/231.14, 231.16, 250/231.18; 356/616, 617; 324/175; 341/13, 11, 31

(56) References Cited

U.S. PATENT DOCUMENTS

| 3,894,232 | A | | 7/1975 | Laspesa |
| 4,647,769 | A | * | 3/1987 | Stone et al. .......... 250/231 SE |
| 4,650,996 | A | | 3/1987 | Maehara et al. |
| 4,703,309 | A | | 10/1987 | Krohn |
| 4,737,635 | A | | 4/1988 | Uchida |
| 4,794,250 | A | | 12/1988 | Togami |
| 5,057,684 | A | | 10/1991 | Service |
| 5,073,710 | A | * | 12/1991 | Takagi et al. .......... 250/231.14 |
| 5,107,107 | A | * | 4/1992 | Osborne ................ 250/231.14 |
| 5,701,007 | A | | 12/1997 | Figueria, Jr. |
| 5,701,525 | A | | 12/1997 | Caterino et al. |
| 5,708,496 | A | | 1/1998 | Barnett et al. |
| 5,859,425 | A | | 1/1999 | Mleinek et al. |
| 5,981,941 | A | * | 11/1999 | Takata et al. .......... 250/231.16 |
| 6,166,374 | A | | 12/2000 | Snyder |

* cited by examiner

Primary Examiner—Stephone Allen
Assistant Examiner—Christopher W. Glass
(74) Attorney, Agent, or Firm—Thompson Hine LLP (57) ABSTRACT

An encoder including a light source for emitting light, a photodetector for detecting at least part of the light emitted by the light source, and an encoder film including a plurality of alternating bars and windows and being located between the light source and the photodetector. The encoder includes a mask including a plurality of alternating bars and windows, the mask being located between the light source and the photodetector. The encoder further includes a spacer located between the mask and the encoder film, the encoder film contacting the spacer to maintain a predetermined spacing between the mask and the encoder film.

35 Claims, 12 Drawing Sheets

FIG. 11

ENCODER WITH MASK SPACER CONTACTING THE ENCODER FILM

TECHNICAL FIELD

The present invention is directed to an encoder, and more particularly, to an encoder having a spacer to maintain a predetermined distance between the encoder mask and the encoder film.

BACKGROUND OF THE INVENTION

Optical encoders are used to transform the motion of various components into an electronic waveform to track the location and velocity of the components. For example, printers and other business machines may include encoders to track, for example, the rotational position and velocity of a feedroll shaft, or the linear position and velocity of a printhead. Such encoders typically include a light source (such as a light emitting diode ("LED")) and a photosensor or photodetector (such as a photodiode) to detect light emitted by the light source. The encoder further typically includes an encoder film (such as an encoder strip or encoder wheel) located between the light source and the photodetector, and a mask located between the light source and the photodetector. The encoder film is typically coupled to the shaft, printhead or other component to be tracked such that the encoder film rotates with the shaft or moves with the printhead. The encoder and the mask each usually include a series of alternating bars and windows printed thereon.

In many existing encoders, the mask is embedded in the photodetector. For example, the mask may be etched over the detecting element of the photodetector. However, when the mask is located internally to the photodetector, the encoder typically must include optics to process (i.e. "columnize") the light entering the photodetector. Because optics can be expensive, it may be desired to move the mask externally of the photodetector and adjacent to the encoder strip, which eliminates the need for optics to process and columnize the light.

However, when the mask is moved externally of the photodetector, a tight tolerance must be maintained between the mask and the encoder film to ensure high overall accuracy for the encoder. For example, it is desirable to maintain the mask and encoder film as close as possible to each other without contact in order to ensure that the light passing through the mask and film is colonized. However, the mask and encoder film should remain spaced apart to avoid rubbing off the bars printed on the mask or encoder film, and to avoid other undesired effects that may be caused by friction between the mask and encoder film.

SUMMARY OF THE INVENTION

The present invention is an encoder which includes an encoder film, a mask, and a spacer located between the mask and the encoder film to maintain a set spacing between the mask and the encoder film. In one embodiment the invention is an encoder including a light source for emitting light, a photodetector for detecting at least part of the light emitted by the light source, and an encoder film including a plurality of alternating bars and windows and being located between the light source and the photodetector. The encoder includes a mask including a plurality of alternating bars and windows, and the mask is located between the light source and the photodetector. The encoder further includes a spacer located between the mask and the encoder film, the encoder film being biased against the spacer to maintain a predetermined spacing between the mask and the encoder film.

Other objects and advantages of the present invention will be apparent from the following description and the accompanying drawings.

DETAILED DESCRIPTION

Figure 1:
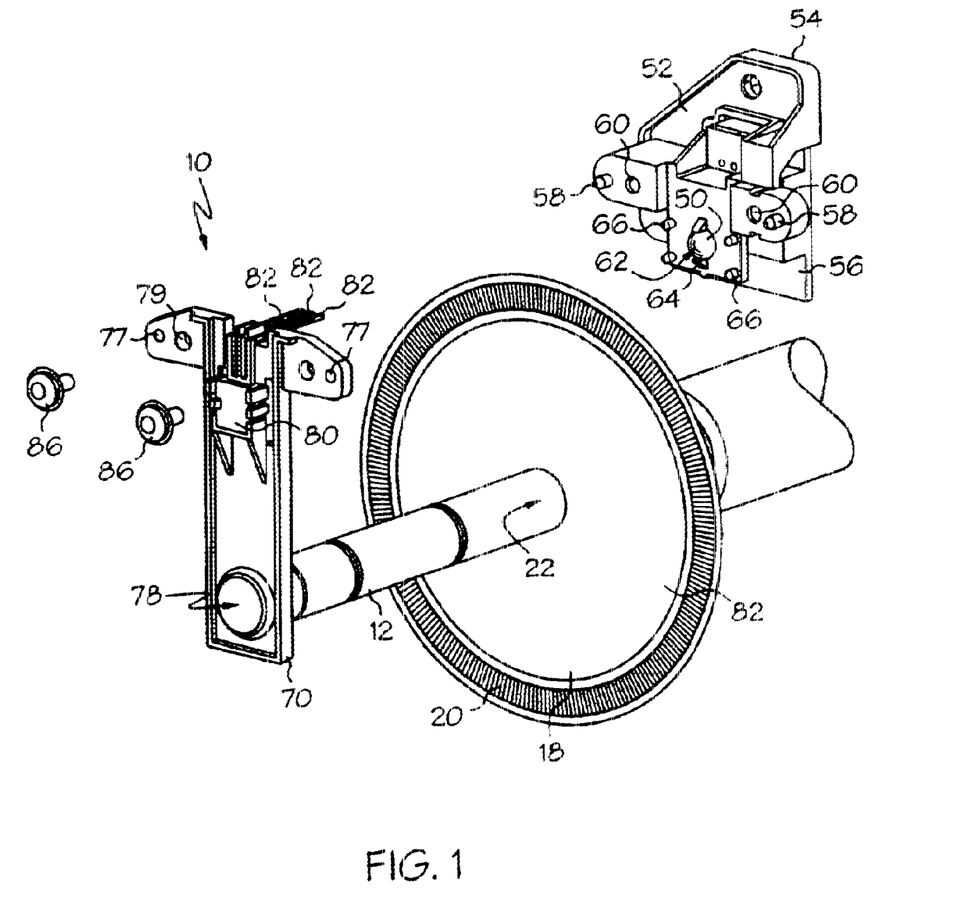
FIG. 1 is a front perspective partially exploded view of one embodiment of he encoder of the present invention.
Figure 2:
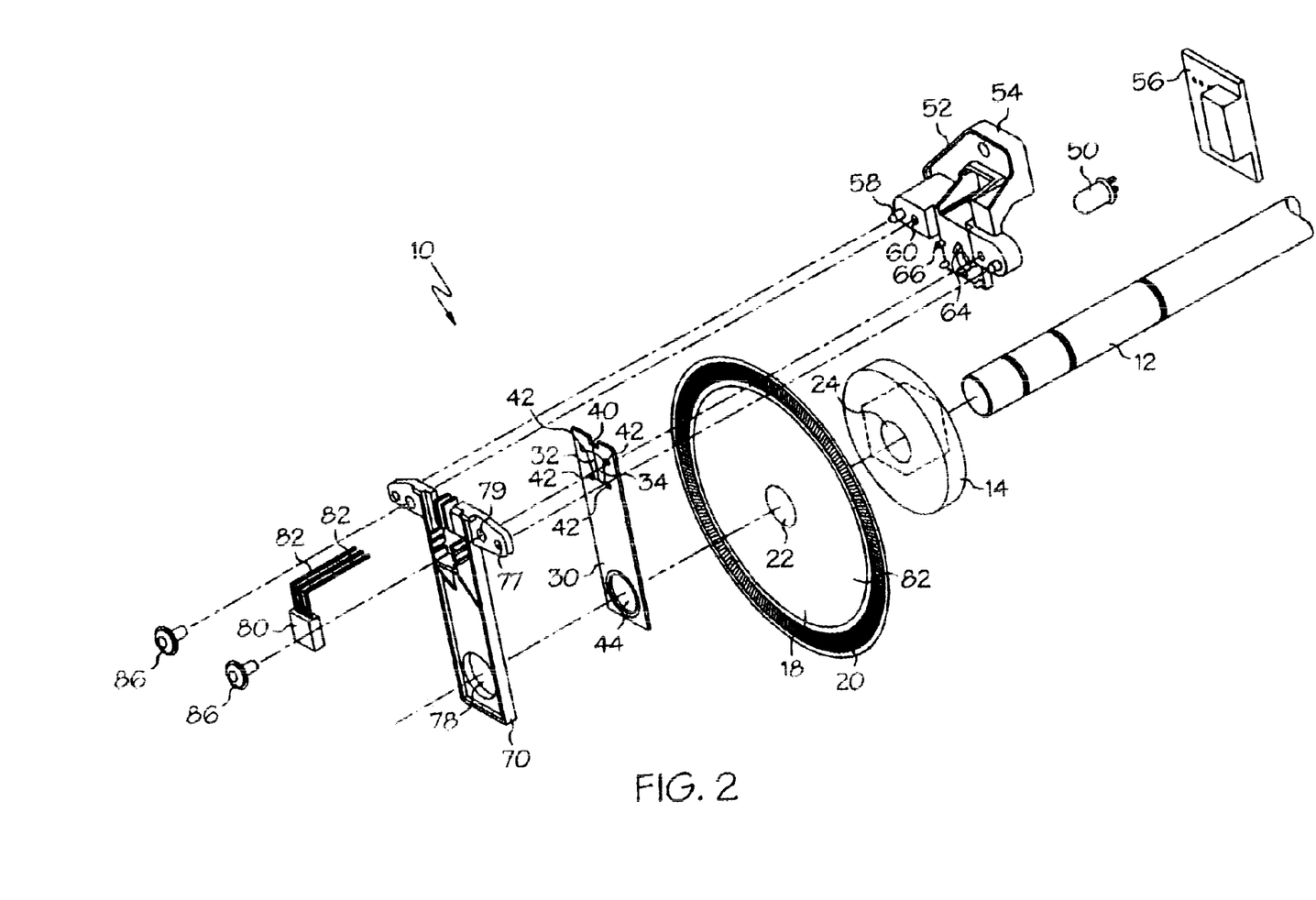
FIG. 2 is a front perspective exploded view of the encoder of FIG. 1.
Figure 3:
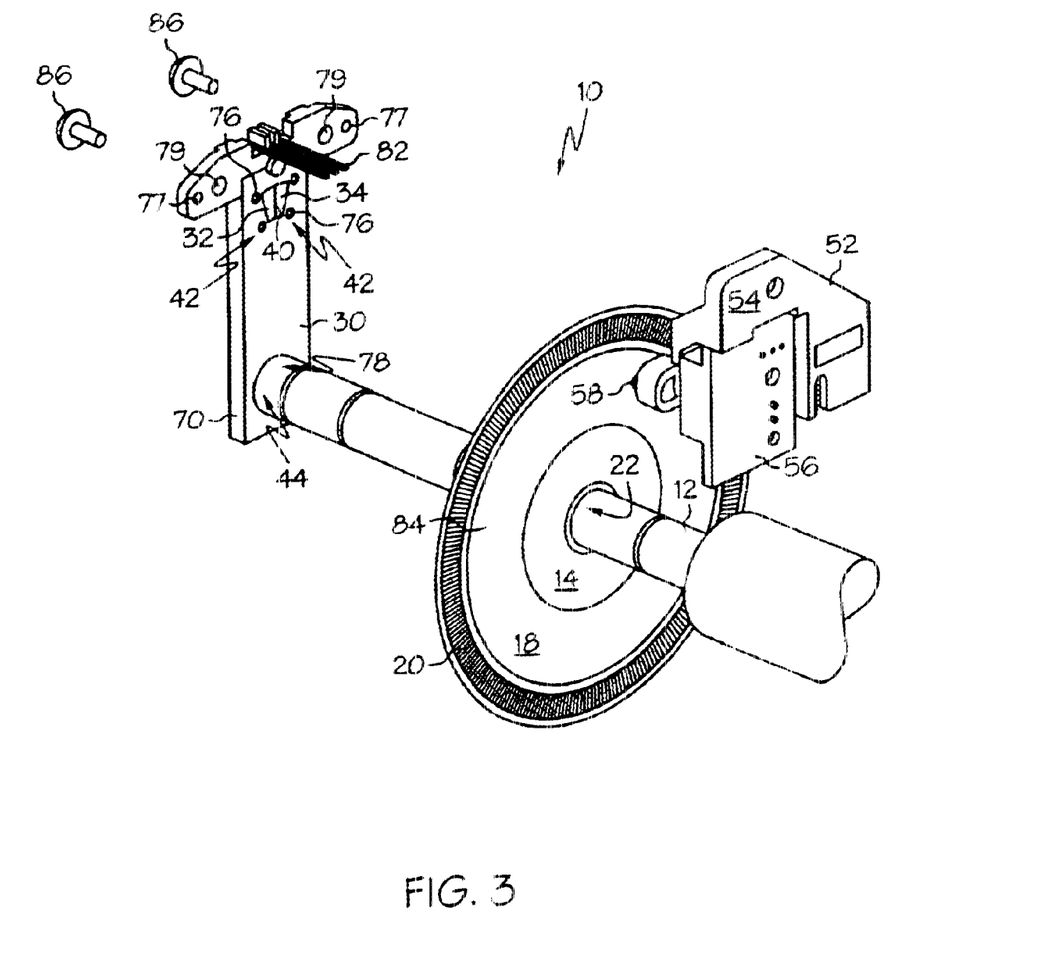
FIG. 3 is a rear perspective partially exploded view of the encoder of FIG. 1.
Figure 4:
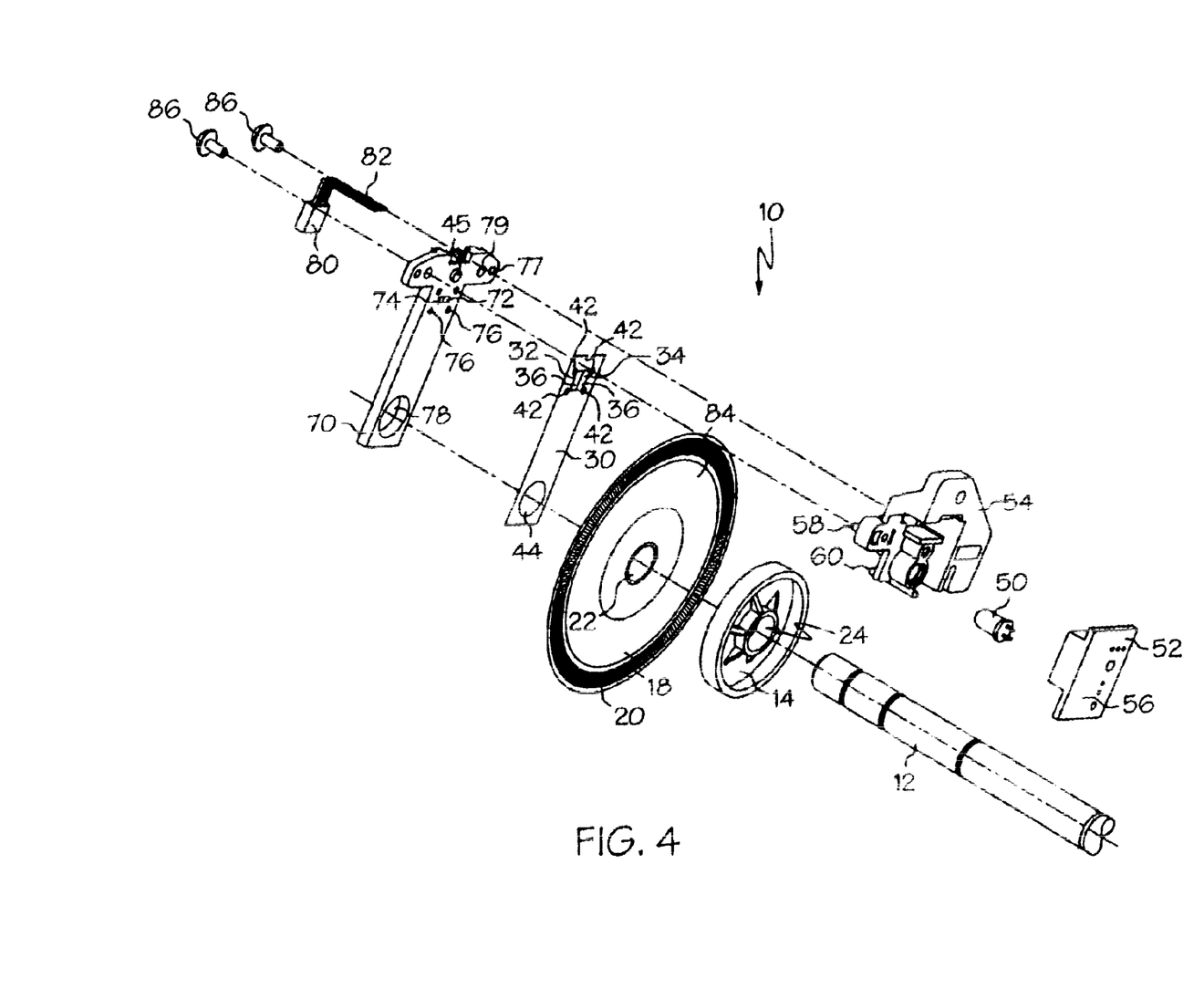
FIG. 4 is a rear perspective exploded view of the encoder of FIG. 1.

As shown in FIGS. 1–4, in one embodiment the encoder of the present invention, generally designated 10, includes a shaft 12 and a gear 14 mounted to a distal end of the shaft 12. The shaft 12 can be rotatably driven by a motor (not shown). An encoder film 18 is mounted to the gear 14, such as by an adhesive, and the gear 14 provides support and stiffness to the encoder film 18. As shown in FIGS. 1 and 3, the encoder film 18 includes a printed pattern 20 that includes a plurality of narrow, alternating bars and windows formed about an outer periphery of the encoder film. The bars are preferably black printed matter that block light, and the windows are transparent portions that allow light therethrough. Each of the bars and windows of the printed pattern 20 preferably include a uniform thickness. The encoder film 18 includes a central opening 22 which is shaped to receive the shaft 12 therethrough.

It should be understood that although the encoder film 18 is referred to herein as a "film", the encoder film can be made from a wide variety of materials (i.e. not necessarily films) that includes a plurality of transparent or translucent portions (windows) and opaque portions (bars). The encoder film 18 is preferably made of a relatively transparent, flexible material such as MYLAR® film or polyester film with the plurality of bars printed thereon. Furthermore, the encoder film 18 may have a variety of shapes, such as circular (as illustrated) as well as other acceptable shapes such as rectangular (for a linear encoder), portions of a circle, etc.

Figure 9:
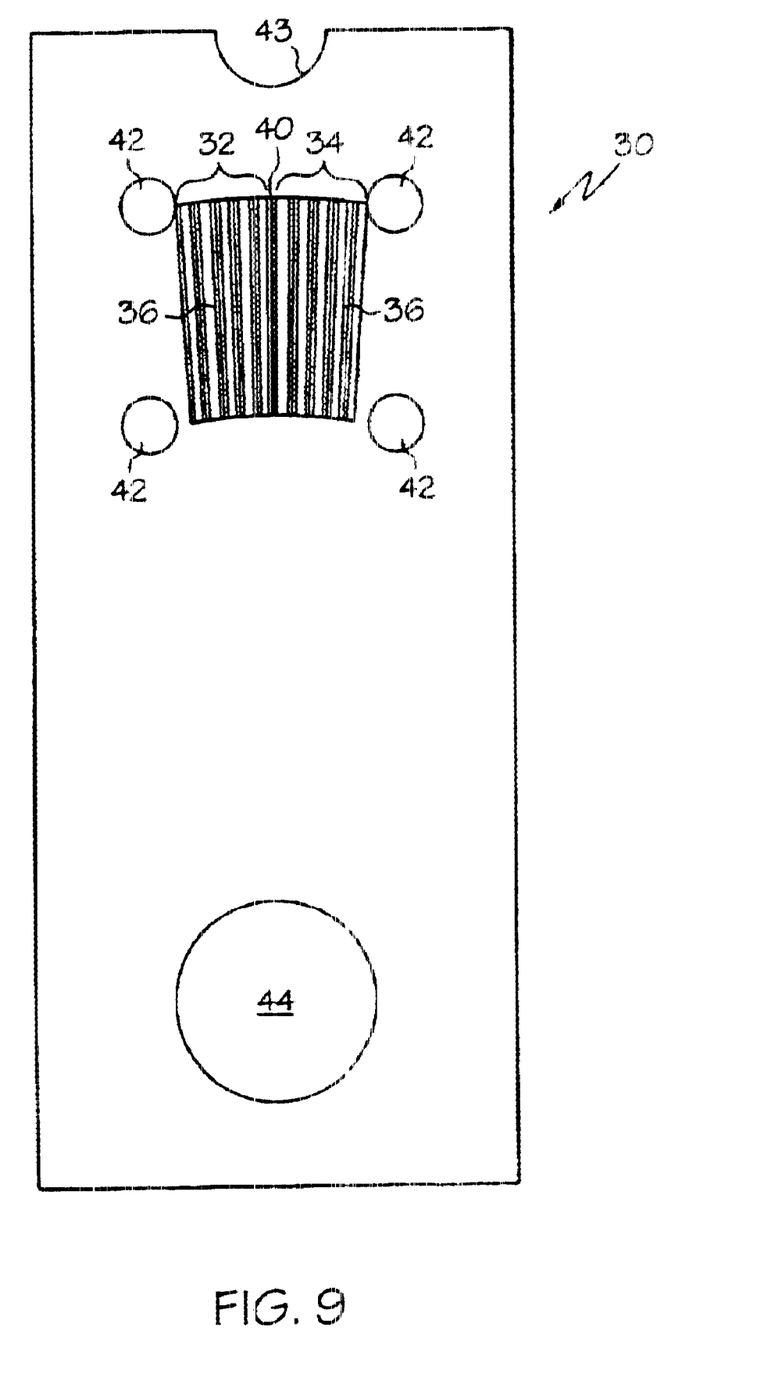
FIG. 9 is a front perspective view of the mask of the encoder of FIG. 1.

The encoder 10 includes a mask 30, as shown in FIG. 9 (the size of the various components in FIG. 9 are not necessarily to scale). The mask 30 includes a pair of mask segments 32, 34, each mask segment 32, 34 including a printed pattern 36. The pattern 36 of each mask segment 32, 34 includes a plurality of bars and openings that preferably correspond in spacing and orientation to the pattern 20 of bars and windows on the encoder film 18. For example, the mask 30 may be made of the same film material as the encoder film 18, and each mask segment 32, 34 can be identical to a segment of the pattern 20 of the encoder film 18. The spacing of the pattern 36 of bars and windows on mask segment 32 is preferably misaligned with the pattern 36 of bars and windows of mask segment 34. For example, if the encoder 10 is a quadrature encoder, each segment 32, 34 may be offset by a quarter of the resolution of the pattern 20 of the encoder film 18 in a manner well known in the art. Thus, for example, the "junction" 40 between the two segments 32, 34 may be a bar that has a thickness of about 1½ times that of the other bars of the patterns 20, 36, in a manner well known in the art.

The mask 30 include s a set of four alignment openings 42 located about the mask segments 32, 34, and a distal opening 44 shaped to receive the shaft 12 therethrough. The mask 30 further includes an alignment notch 43 formed in an upper edge of the mask 30.

Figure 5:
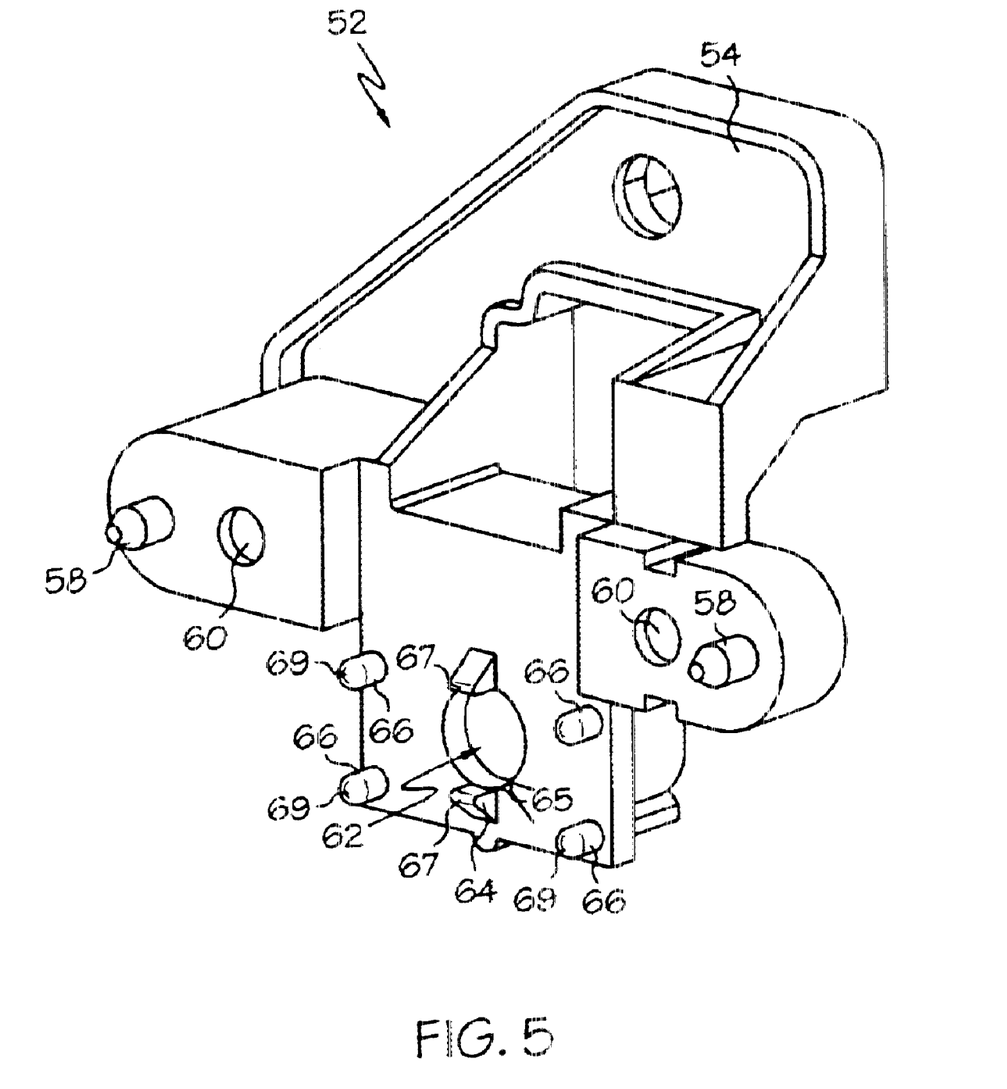
FIG. 5 is a front perspective view of the light source housing of the encoder of FIG. 1.

Returning to FIGS. 1–4, the encoder 10 further includes a light source 50, such as an LED, mounted to a light source housing 52. The light source housing 52 includes a front portion 54 and a back plate 56, which may be a printed circuit board, coupled to the front portion 54 to capture the light source 50 inside the light source housing 52. As shown in FIG. 5, the light source housing 52 includes a pair of outer opposed attachment tabs 58 and a pair of opposed fastener openings 60. The light source housing 52 further includes a light source opening 62 that is shaped to receive the light source 50 therethrough.

Figure 6:
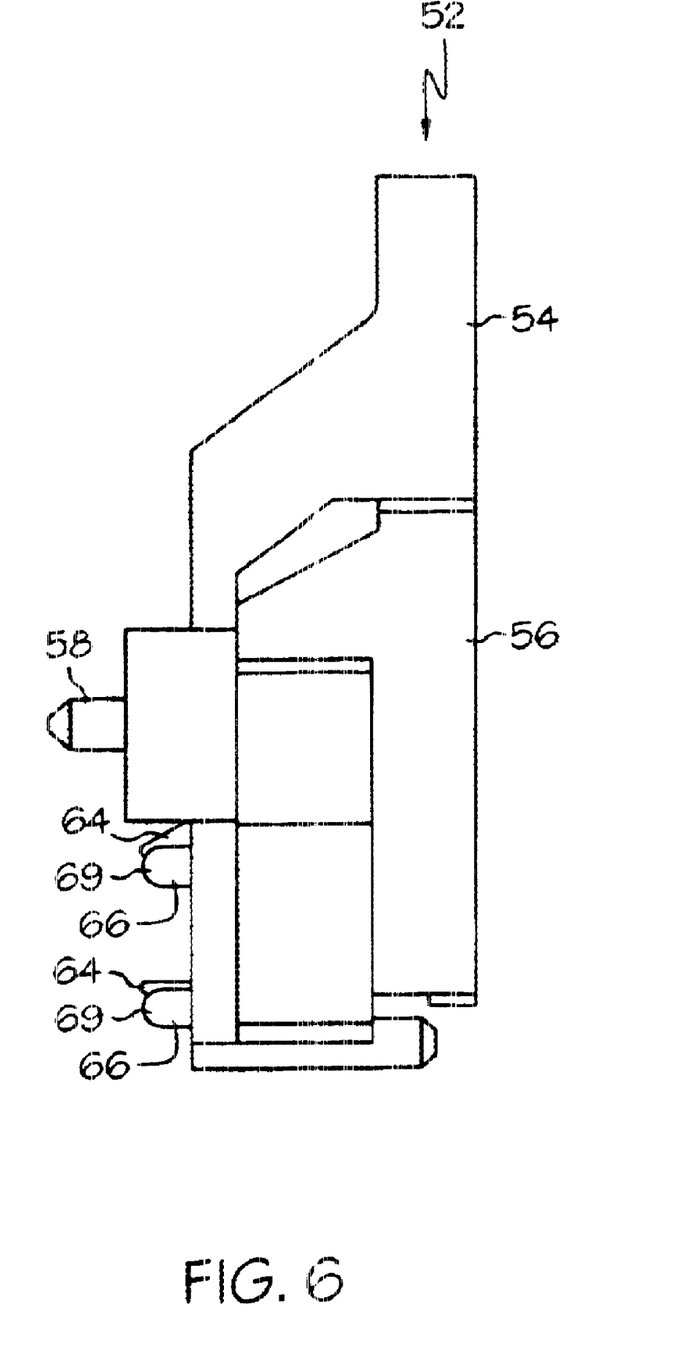
FIG. 6 is a side view of the light source housing of FIG. 5.

The light source housing 52 further includes a pair of generally ramp-shaped biasing protrusions 64 located on opposed sides of the light source opening 62, and a set of four generally cylindrical biasing protrusions 66 located about the light source opening 62. Each cylindrical biasing protrusion has a generally hemispherical tip 69 The ramp-shaped biasing protrusions 64 and cylindrical biasing protrusions 66 are located around the light source opening 62 in a generally rectangular pattern. As shown in FIG. 6, the biasing protrusions 64, 66 are coupled to, extend and generally outwardly from, the light source housing 52.

Figure 7:
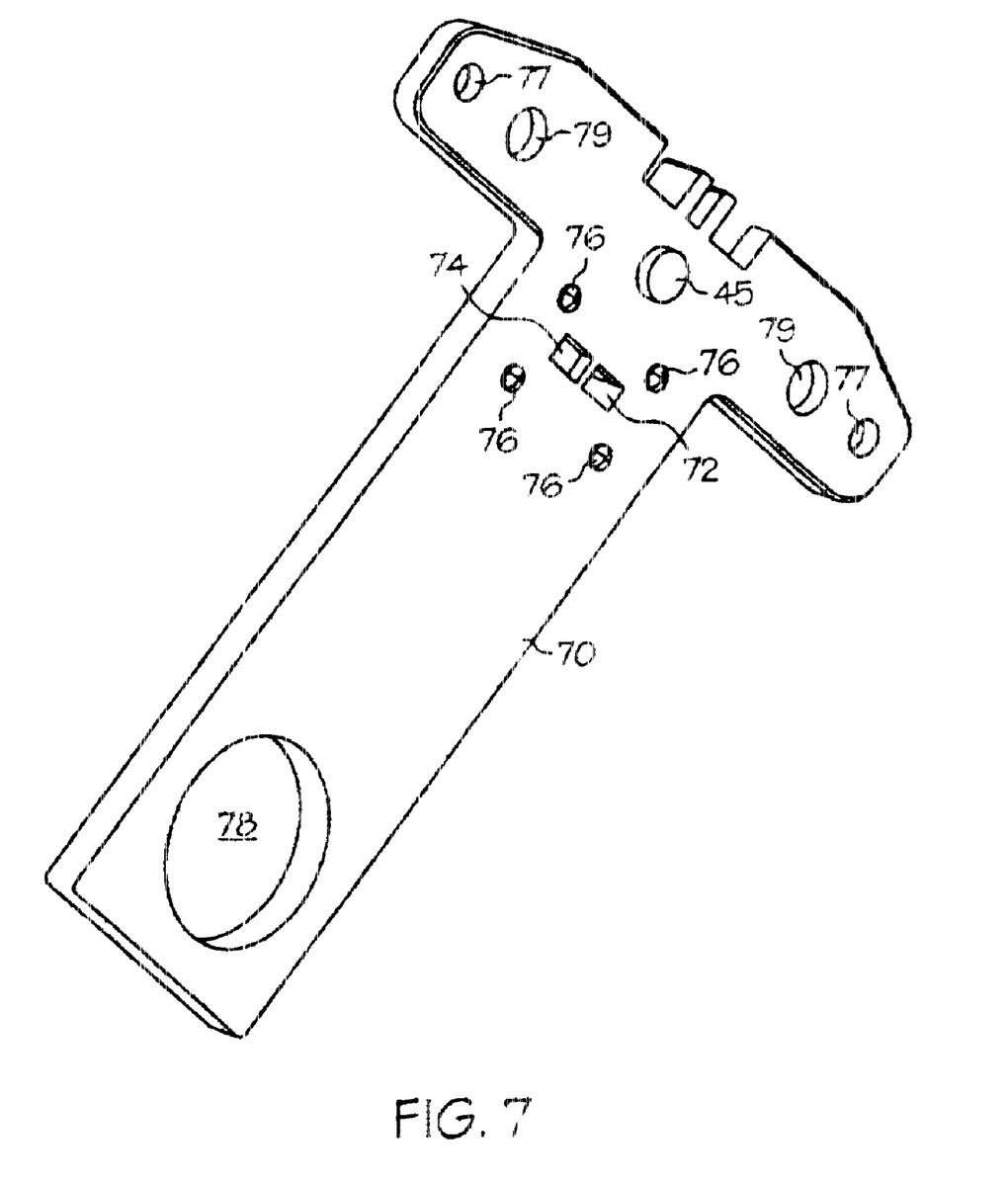
FIG. 7 is a front perspective view of the mask support of the encoder of FIG. 1.

As best shown in FIG. 7, the encoder 10 includes a mask support 70. The mask support 70 includes a pair of apertures 72, 74, and is shaped to receive a photodetector 80, such as photo diode, on its back side (see FIGS. 1 and 2). The photodetector 80 includes a set of output lines 82, and is mounted to the mask support 70 such that the photodetector can detect light that passes through the apertures 72, 74.

Figure 8:
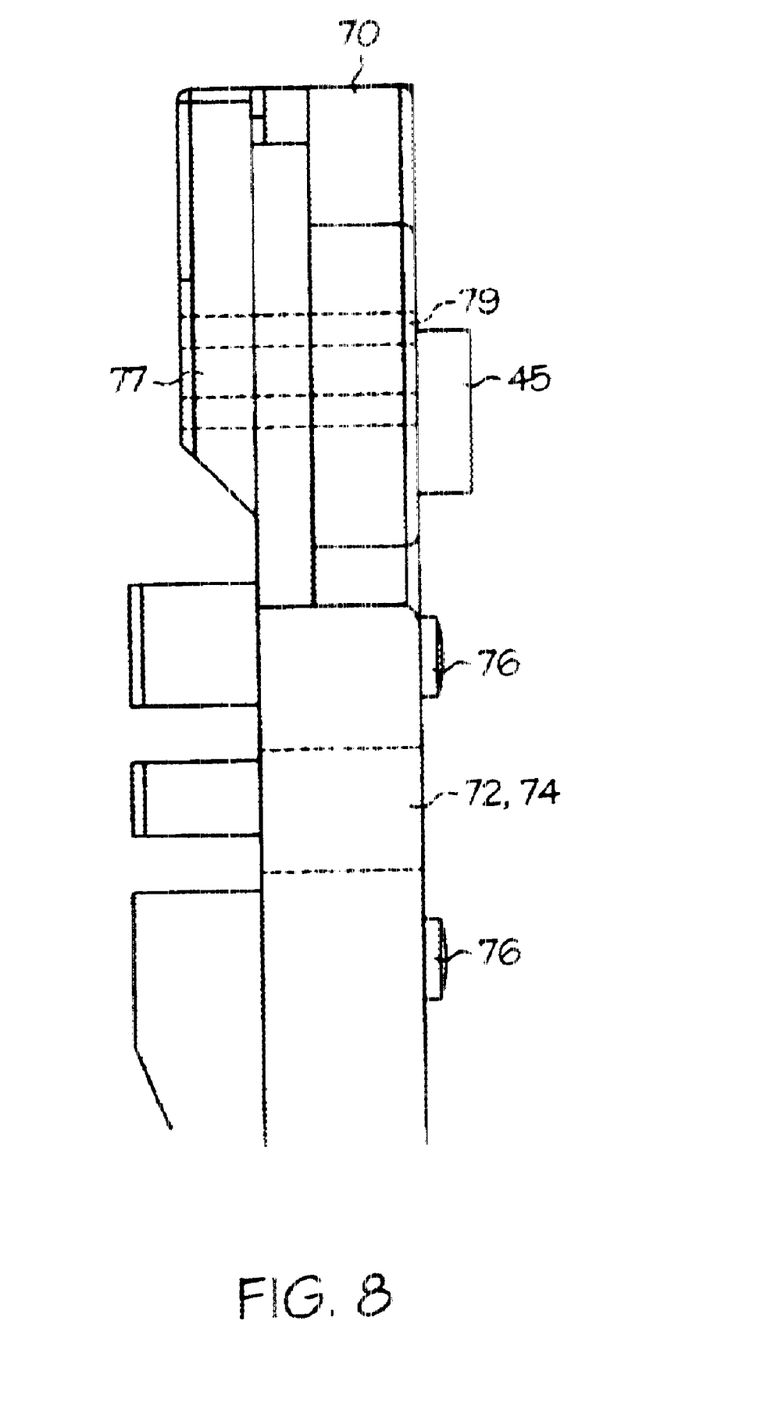
FIG. 8 is a side view of an upper portion of the mask support of FIG. 7.

The mask support 70 includes a set of four spacing protrusions 76 that are coupled to and extend outwardly from the mask support 70 (also see FIG. 8). The spacing protrusions 76 are located about the apertures 72, 74 in a generally rectangular pattern. The spacing protrusions 76 may include a variety of shapes at their tips, such as flat, hemispherical, conical, etc. The mask support 70 includes a distal opening 78 shaped to receive the shaft therethrough, and a locating tab 45 located above the apertures 72, 74. The mask support 70 further includes a pair of opposed attachment openings 77 and a pair of opposed fastener openings 79.

Figure 9A:
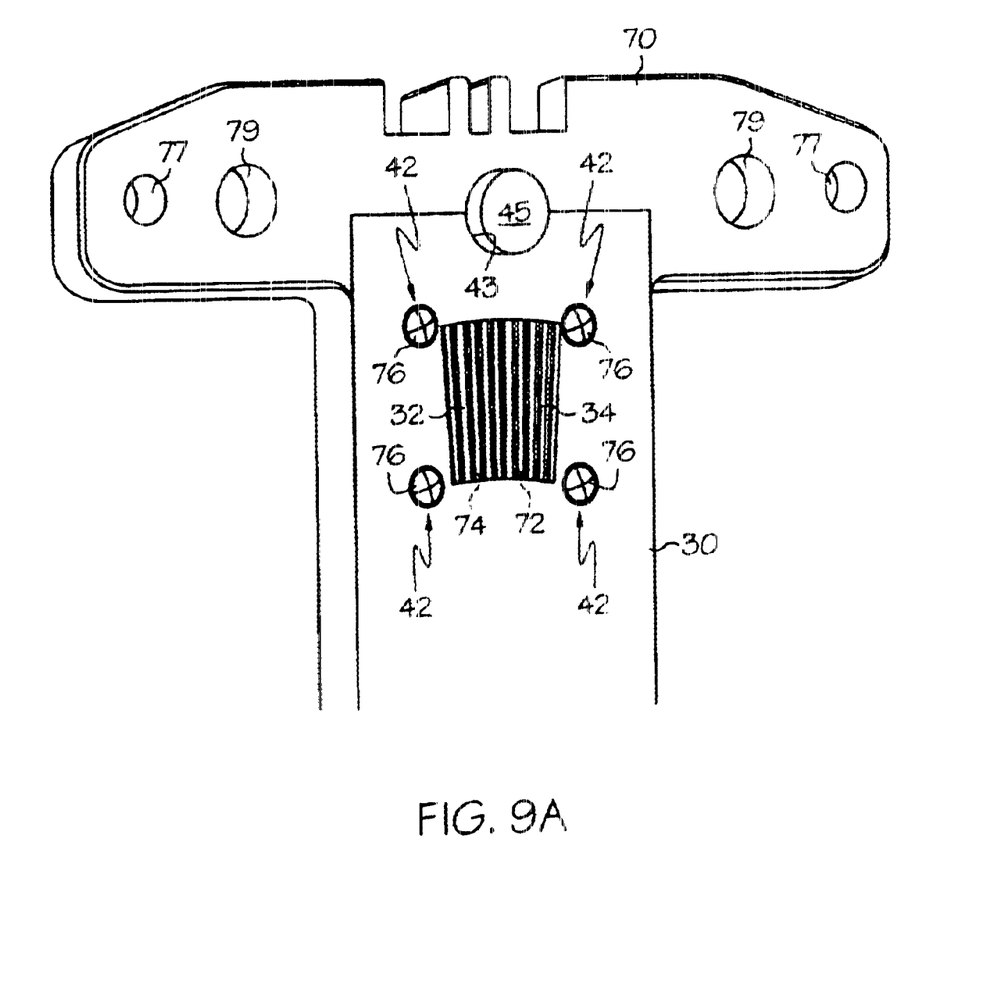
FIG. 9A is a front view of the mask support of FIGS. 7-8 with the mask of FIG. 9 mounted thereon.

As best shown in FIGS. 1 and 3, when the encoder 10 is assembled, the light source 50 is coupled to the light source housing 52 such that light source 50 protrudes through the light source opening 62. The mask 30 is mounted to the mask support 70 such that the spacing protrusions 76 of the mask support 70 are received through the alignment openings 42 of the mask 30, and the alignment tab 45 is received in the alignment notch 43 (see FIG. 9A). The mask 30 is preferably aligned on the mask support 70 such that each mask segment 32, 34 is located over one of the apertures 74, 72. The cooperation between the alignment openings 42 and the spacing protrusions 76, and between the alignment tab 45 and alignment notch 43, ensures that the mask 30 is located in the desired location on the mask support 70. The mask 30 may be secured to the mask support 70 by various means, such as by an adhesive. The photodetector 80 is mounted to the mask support 70 such that the photodetector 80 can detect light emitted by the light source 50 that passes through the encoder film 18, mask 30 and apertures 72, 74.

Figure 10:
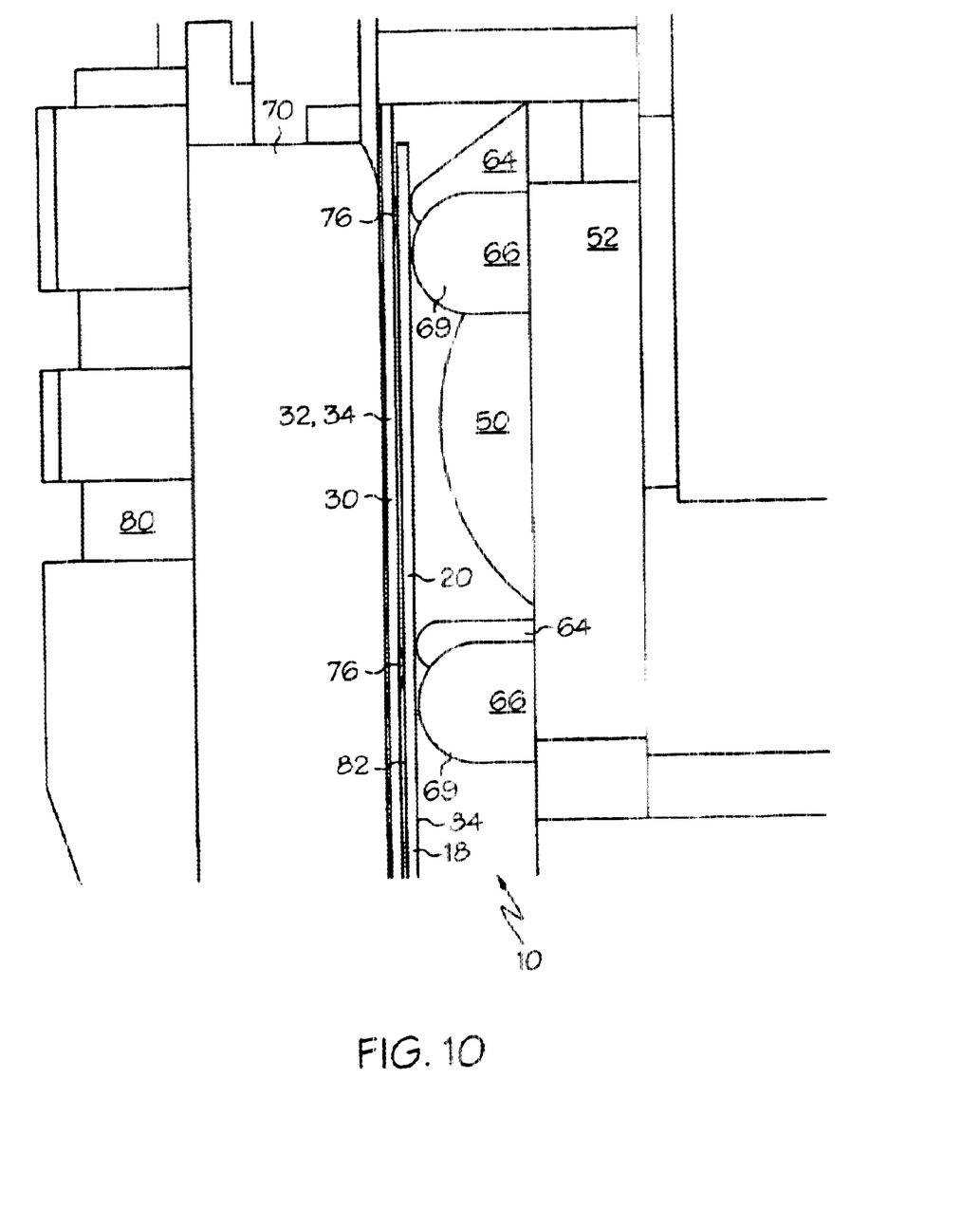
FIG. 10 is a side view of the assembled encoder of FIG. 1.

The shaft 12 is received through the central opening 24 of the gear 14, the central opening 22 of the encoder film 18, the distal opening 44 of the mask 30 the distal opening 78 of the mask support 70. The encoder film 18 is mounted about the shaft 12 such that the encoder film 18 rotates with the shaft 12 and the pattern 20 of bars and windows is located in front of the light source 50. The attachment tabs 58 of the light source housing 52 are received through the attachment openings 77 of the mask support 70 to align the light source housing 52 relative to the mask support 70 such that the apertures 72, 74 of the mask support 70 are aligned with the light source 50. Next, a set of screws 86 are passed through to the fastener openings 79 of the mask support 70 and the fastener openings 60 of the light source housing 52 to couple the support 70 and housing 52 together. As shown in FIG. 10, when the encoder 10 is fully assembled, the spacing protrusions 76 of the mask support 70 extend through the mask 30 and engage the inner surface 82 of the encoder film 18.

In operation, the shaft 12 is rotated by the motor and the light source 50 is activated to emit light during rotation of the shaft 12. As the shaft 12 is rotated, the gear 14 and encoder film 18 are rotated along with the shaft 12. In this manner, light emitted by the light source 50 and passing through the encoder film 18 is selectively blocked, and permitted to pass through, the mask segments 32, 34 of the mask 30 in a manner well known in the art. For example, when the bars of the pattern 20 of the encoder film 18 are aligned with the bars of the pattern 36 of a mask segment 32, 34, the emitted light passes through the encoder film 18 and mask segment 32, 34 and is detected by the photodetector 80. In contrast, when the bars of the pattern 20 of the encoder film 18 are aligned with the windows of the pattern 36 of a mask segment 32, 34, the encoder film 18 and mask segment 32, 34 block light from passing through that aperture 72, 74 of the mask support 70.

As noted earlier, the two mask segments 32, 34 of the mask 30 may provide for two output signals that are 90° out of phase with each other, which can provide information relating to the direction of rotation of the shaft 12. In other words, when the bars of the pattern 36 of mask segment 32 are aligned with the bars of the pattern 20 of the encoder 18 (and light can thereby pass through the mask segment 32 and aperture 74), the bars of the pattern 36 of mask segment 34 are aligned with the windows of the pattern 20 of the encoder 18 (and light is blocked from passing through the mask segment 34 and aperture 72).

The photodetector 80 can be coupled to a processor or controller (not shown) by the output lines 82. The controller can process the signals outputted by the photodetector 80 to thereby determine the angular location and velocity of the shaft 12.

Figure 11:
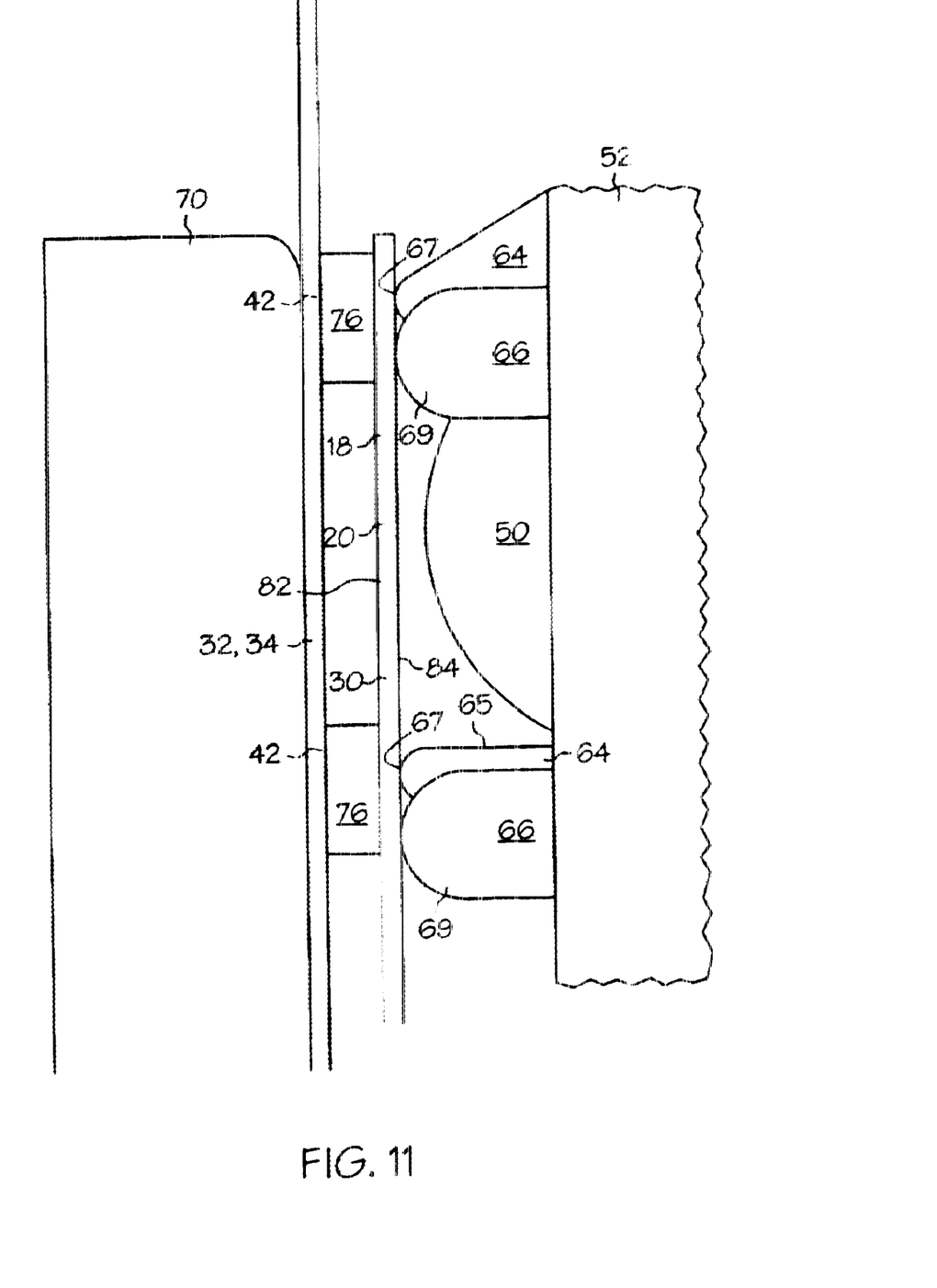
FIG. 11 is a detailed view of the encoder of FIG. 10, with the size of the spacing protrusions exaggerated for illustrative purposes.

As noted earlier, when the encoder 10 is fully assembled, the spacing protrusions 76 of the mask support 70 extend through the mask 30 and engage the inner surface 82 of the encoder film 18 (see FIG. 10). As shown in FIG. 10, the spacing protrusions 76 may extend forwardly a relatively small distance (such as, for example, between 50–100 microns) to ensure close spacing between the mask 30 and encoder film 18. FIG. 11 illustrates the encoder of FIG. 10 with the size of the spacing protrusions 76 exaggerated for illustrative purposes. While the spacing protrusions 76 of the mask support 70 engage the inner surface 82 of the encoder film 18, the biasing protrusions 64, 66 of the light source housing 52 engage an outer surface 84 of the encoder film 18 to urge or bias the encoder film 18 against the spacing protrusions 76. In this manner, as shown in FIGS. 10 and 11, the mask 30 and encoder film 18 are in close, parallel alignment, but remain spaced apart to avoid contact between the encoder film 18 and mask 30. In other words, the encoder film 18 is "captured" between the spacing protrusions 76 and biasing protrusions 64, 66. In this manner, when the encoder film 18 is rotated by the shaft 12, the encoder film 18 can slide between the biasing protrusions 64, 66 and spacing protrusions 76, and a desired spacing between mask 30 and encoder film 18 can be maintained. Thus, the encoder film 18 is maintained in a position close to the mask 30. This ensures that the rays of light that pass through the mask 30 and strip 18 have sharp, well-defined outer edges, or a sharp resolution. Furthermore, the encoder film 18 is prevented from contacting the mask 30, which avoids the adverse effects discussed earlier.

It may be desired to place a set of biasing protrusions as closed as possible to the light detecting element 50, and therefore the ramp-shaped protrusions 64 are located on either side of the light detecting element. Although it may be desired to use, in general, cylindrical biasing protrusions with hemispherical tips such as the protrusions 66, the ramp-shaped protrusions 64 include the sharp inner edges 65 to ensure that the tips 67 of the protrusions 64 are located in the proper position such that the tips 67 engage the encoder film 30 at the proper location. It should be further understood that the biasing protrusions may take a variety of shapes beyond the tabs or pins shown herein, and may include springs, plates, air jets, and the like without departing from the scope of the present invention.

As noted earlier, the encoder film 18 and gear 14, as well as mask support 70 and mask 30, are each mounted to the shaft 12. This feature helps to ensure that the mask 30 is properly aligned with the encoder film 18. For example, manufacturing tolerances for locating the distal opening 44 in the mask 30 and the central opening 22 of the encoder film 18 are relatively tight (i.e. manufacturing clearance is small). Thus, because the distal opening 44 and central opening 22 can both be accurately located, when the mask 30 and encoder film 18 are both mounted onto the shaft 12, the mask 30 is properly and precisely aligned relative to the encoder film 18. This feature ensures precise alignment between the mask 30 and encoder film 18, and ensures that the optical center of the patterns 36 on the mask 30 are aligned with the optical center of the pattern 20 on the encoder film 18.

Although the encoder 10 is described and shown with reference to a rotary encoder, it should be understood that the present invention may also be used with a linear encoder or other encoders without departing from the scope of the present invention. For example, in the case of a linear encoder, a linear encoder strip that slides laterally can be pressed against a set of spacing protrusions by a set of biasing protrusions, similar to those described above. The linear encoder strip will simply slide laterally between the biasing protrusions spacing protrusions instead of being Attorney rotated between the biasing protrusions and spacing protrusions in a manner that would be apparent to one of ordinary skill in the art upon a reading of this specification.

Having described the invention in detail and by reference to the preferred embodiments, it will be apparent that modifications and variations thereof are possible without departing from the scope of the invention.

What is claimed is:

1. An encoder comprising:
    a light source for emitting light;
    a photodetector for detecting at least part of the light emitted by said light source;
    an encoder film including a plurality of alternating bars and windows and being located between said light source and said photodetector, said encoder film being rotatable about a central axis;
    a mask including a plurality of alternating bars and windows and being located between said light source and said photodetector; and
    a spacer located at least partially between said mask and said encoder film and generally fixed relative to said encoder film such that said spacer contacts said encoder film at a contact area which is located in an outer radial half of said encoder film to maintain a predetermined spacing between said mask and said encoder film.

2. The encoder of claim 1 wherein said spacer is located adjacent to said photodetector.

3. The encoder of claim 2 wherein said mask is coupled to a mask support, and wherein said spacer is coupled to and extends generally forwardly from said mask support.

4. The encoder of claim 3 wherein said spacer extends through said mask.

5. The encoder of claim 1 further comprising at least one biasing protrusion that engages said encoder film and urges said encoder film against said spacer.

6. The encoder of claim 5 wherein said light source is coupled to a light source housing, and wherein said biasing protrusion is coupled to and extends generally forwardly from said light source housing.

7. The encoder of claim 6 wherein said photodetector is coupled to a mask support, and wherein said spacer is coupled to and extends generally forwardly from said mask support, and wherein said light source housing is coupled to said mask support.

8. The encoder of claim 5 wherein said biasing protrusion includes a generally hemispherical tip.

9. The encoder of claim 1 wherein said encoder film is flexible.

10. The encoder of claim 1 wherein said mask is coupled to a mask support, and wherein said spacer includes at least one spacing protrusion that extends forwardly from said mask support, and wherein said encoder film is biased against an end of said at least one spacing protrusion.

11. The encoder of claim 10 wherein said at least one spacing protrusion extends through said mask.

12. The encoder of claim 1 wherein said encoder film is a generally circular piece of material that is rotatable about a central axis, and wherein at least part of said alternating bars and windows are located adjacent to an outer edge of said encoder film.

13. The encoder of claim 12 wherein said mask includes a distal opening, and wherein said distal opening is aligned with said central axis of said encoder film.

14. The encoder of claim 13 wherein said encoder film includes a central opening receiving a driven shaft therethrough, and wherein said distal opening receives said shaft therethrough.

15. The encoder of claim 1 wherein the spacing of said bars and windows of said mask generally corresponds to the spacing of said bars and windows of said encoder film such that when said bars of said mask are aligned with said windows of said encoder film said mask generally blocks light emitted from said light source from being detected by said photodetector, and when said bars of said mask are aligned with said bars of said encoder film said mask allows light emitted from said light source to be detected by said photodetector.

16. The encoder of claim 1 wherein said light source is a light emitting diode.

17. The encoder of claim 1 wherein said spacer includes four spacing protrusions that extend through said mask such that said spacing protrusions form a generally rectangular shape that extends around said photodetector, and wherein said encoder further includes a set of biasing protrusions that engage said encoder film to bias said encoder film against said spacing protrusions.

18. The encoder of claim 1 further comprising a mask support and wherein said mask is coupled to said mask support.

19. The encoder of claim 18 wherein said photodetector is mounted to said mask support, and wherein said mask support includes an aperture to enable light emitted from said light source to pass therethrough and be detected by said photodetector.

20. The encoder of claim 1 further comprising a mask support, said photodetector being mounted to said mask support, said spacer including at least two spacing protrusions coupled to and extending forwardly from said mask support, said mask including at least two openings shaped and located to receive one of said spacing protrusions therethrough to align said mask in a desired configuration relative to said mask support.

21. The encoder of claim 1 further comprising a mask support, and wherein said mask is coupled to said mask support and said spacer is coupled to and extends outwardly from said mask support.

22. The encoder of claim 21 wherein said mask is coupled to said mask support by an adhesive.

23. The encoder of claim 1 wherein said mask includes a pair of mask segments, each mask segment including a pattern of bars and windows, and wherein said mask support includes a pair of apertures, and wherein each mask segment is located over one of said apertures.

24. The encoder of claim 1 further comprising a light source housing including an opening therein, and wherein said light source is coupled to said light source housing and at least part of said light source housing protrudes through said opening, said light source housing including a plurality of biasing protrusions that engage said encoder strip and bias said encoder strip against said spacer, wherein said biasing protrusions are located around the periphery of said opening.

25. The encoder of claim 1 wherein light emitted from said light source and received by said photodetector travels along a light path line extending between said light source and said photodetector, and wherein said light path line does not intersect said spacer.

26. The encoder of claim 1 wherein said film is rotatable about an axis, and wherein said spacer is radially offset relative to said axis.

27. The encoder of claim 1 wherein said encoder film is movable relative to at least one of said photodetector and said light source, and wherein said spacer remains generally stationary relative to said encoder film when said encoder film is moved.

28. The encoder of claim 1 wherein said film slides over said spacer when said film is moved relative to at least one of said photodetector and said light source.

29. An encoder comprising:

a light source for emitting light, said light source including a housing;

a mask support;

a photodetector for detecting at least part of said light emitted by said light source, said photodetector being coupled to said mask support;

a mask including a plurality of alternating bars and windows and being coupled to said mask support;

an movable encoder film including a plurality of alternating bars and windows and being located between said mask and said light source;

a spacer coupled to and extending forwardly from said mask support, said spacer engaging a first side of said encoder film; and urging means coupled to and extending forwardly from said light source housing, said urging means urging said encoder film against said spacer such that said spacer contacts said encoder film at a contact area which is located adjacent to an outer edge of said encoder film to maintain a predetermined spacing between said mask and said encoder film.

30. A method for operating an encoder comprising the steps of:

providing an encoder including a light source, a photodetector, an encoder film including a plurality of alternating bars and windows and being located between said light source and said photodetector, said encoder film being coupled to a movable component which is rotatable about a central axis, a mask including a plurality of alternating bars and windows and being located between said light source and said photodetector, and a spacer located at least partially between said mask and said encoder film, said spacer contacting said encoder film at a contact area which is located in an outer radial half of said encoder film to maintain a predetermined spacing between said mask and said encoder film;

causing said light source to emit light;

causing said movable component to move such that said encoder film is moved relative to said spacer; and monitoring said photodetector to determine the light detected by said photodetector while said component is moved to determine the velocity and location of said component.

31. The method of claim 30 wherein light emitted from said light source and received by said photodetector travels along a light path line extending between said light source and said photodetector, and wherein said light path line does not intersect said spacer.

32. The method of claim 30 wherein said second causing step includes causing said encoder film to rotate about an axis, and wherein said spacer is radially offset relative to said axis.

33. The method of claim 30 wherein said second causing step includes moving said encoder film relative to at least one of said photodetector and said light source, and wherein said spacer remains generally stationary relative to said encoder film when said encoder film is moved.

34. The method of claim 30 wherein encoder film slides over said spacer during said second causing step.

35. An encoder comprising:

a light source for emitting light;

a photodetector for detecting at least part of the light emitted by said light source;

an encoder film including a plurality of alternating bars and windows and being located between said light source and said photodetector;

a mask including a plurality of alternating bars and windows and being located between said light source and said photodetector; and a spacer located at least partially between said mask and said encoder film and generally fixed relative to said encoder film, said spacer contacting said encoder film at a contact area which is located adjacent to an outer edge of said encoder film to maintain a predetermined spacing between said mask and said encoder film.

* * * * *